Feb. 2, 1971  J. A. WEAVER  3,559,488
DIFFERENTIAL PRESSURE MEASURING APPARATUS
Filed Aug. 20, 1969
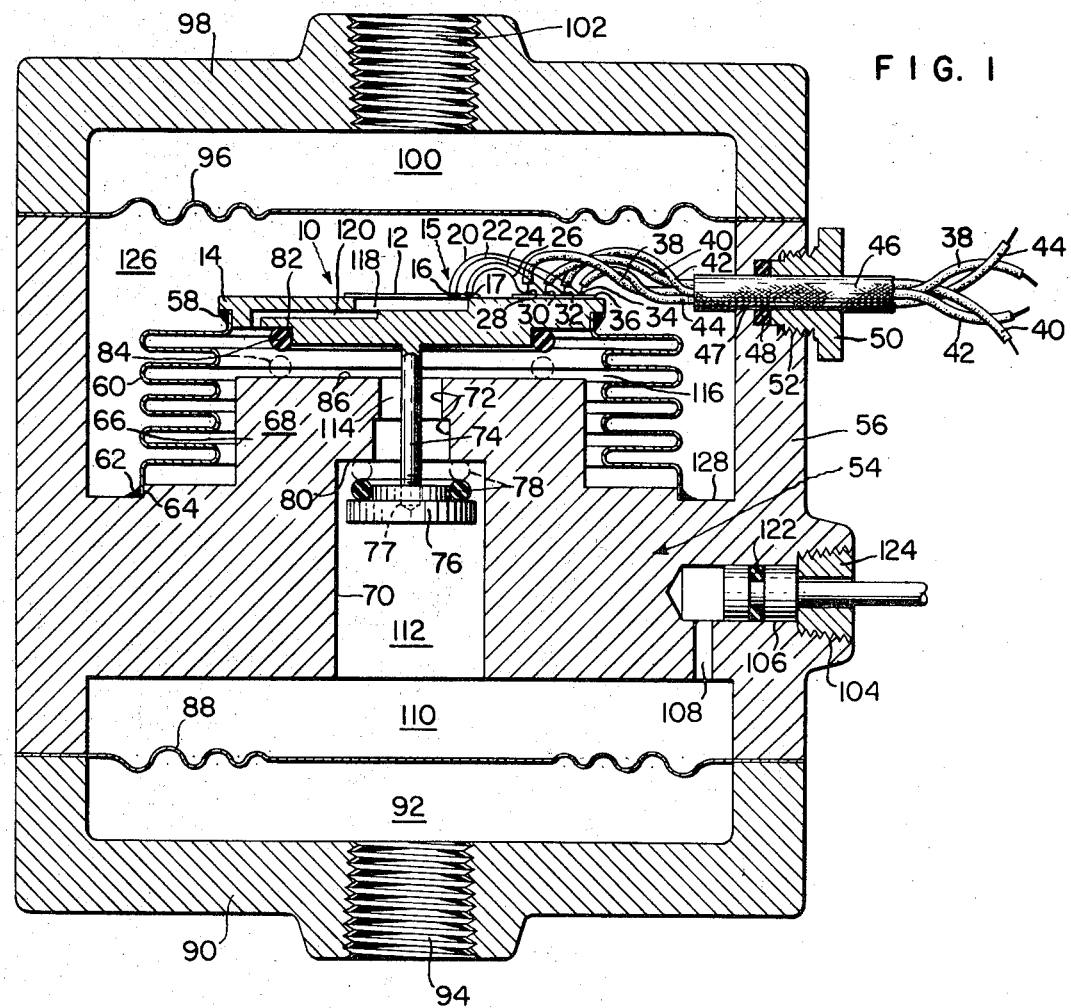
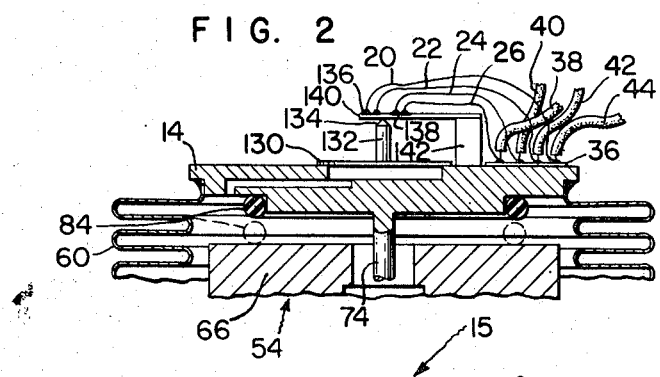
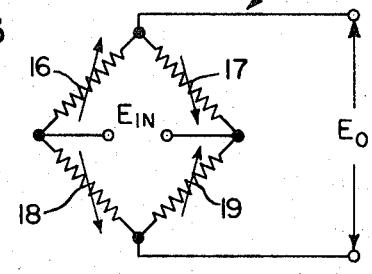
INVENTOR.
JOHN A. WEAVER
BY John Shaw Stevenson
AGENT.

United States Patent Office 3,559,488
Patented Feb. 2, 1971

3,559,488
DIFFERENTIAL PRESSURE MEASURING APPARATUS
John A. Weaver, Philadelphia, Pa., assignor to Honeywell Inc., Minneapolis, Minn., a corporation of Delaware
Filed Aug. 20, 1969, Ser. No. 851,608
Int. Cl. G01l 9/02
U.S. Cl. 73—398                                                10 Claims

ABSTRACT OF THE DISCLOSURE

An extremely sensitive differential pressure to current transducer employing:
(1) A unitary rigid disc and a thin pressure sensing membrane for the closed end portion of a bellows that has an open end mounted on a stationary wall;
(2) An overload valve to protect the membrane against rupture by the separate fluid pressures acting on the internal and external surface of the bellows; and wherein
(3) The overload valve is mounted for movement with the disc and into sealed engagement with one or the other of opposite sides wall surfaces of the stationary wall.

---

It is an object of the present invention to disclose a differential pressure measuring apparatus that has a flexible over-load element whose respective inner and outer surfaces are acted upon by a different one of two fluid pressures under measurement and wherein a flexible pressure sensor is employed as a movable end portion of the flexible overload element to continuously and independently convert the differential-pressure under measurement into an electrical signal as the flexible member is moved between an expanded and a contracted position by changes occurring in the differential-pressure.

It is another object of the present invention to provide an apparatus having a flexible pressure sensor and overload protecting means that will effect an equalizing of the pressure acting on one side of the sensor as the pressure acting on its other side approaches a level that would rupture the sensor.

More specifically, it is another object of the present invention to provide a flexible pressure sensing element as a closed end portion of a bellows so that this sensing element can be employed to detect changes in differential pressure being applied to opposite sides of the bellows.

It is another object of the present invention to provide a flexible member of the aforementioned type which employs strain gages on a flat surface thereof to convert a differential pressure being applied to opposite sides of the flexible member into an electrical signal.

A better understanding of the present invention may be had from the following detailed description when read in connection with the accompanying drawings in which:

FIG. 1 shows one form of the invention in which a flexible pressure sensor in the form of a unitary diaphragm and strain gage unit is employed to sense and convert a differential pressure representative of e.g. the flow of a fluid passing through a conduit, into an electrical signal;

FIG. 2 shows a modified form of the aforementioned differential pressure to current transducer in which strain gages are mounted for movement on a displaceable beam connected for movement with the pressure sensing element rather than being mounted on the pressure sensing element itself as shown in FIG. 1; and FIG. 3 shows how the strain gages form an electric bridge for producing an electric signal that is representative of the magnitude of the differential pressure under measurement.

FIG. 1 shows the pressure sensing apparatus 10 having a flexible pressure sensor in the form of a diaphragm 12 fixedly mounted at its underside portion on and forming a flexible end wall portion of a rigid disc 14.

A strain gage bridge 15 having strain gages 16, 17, 18 and 19 are shown mounted on the upper surface of flexible pressure sensor 12. Fine electrically conductive wires 20, 22, 24, 26 connect the strain gages with associated terminals 28–34 on a terminal block 36 to which heavier conducting wire 38–44 are attached. The latter conductors 38–44 have a cover 46 and are shown in FIG. 1 as passing through port 47 and out of a fluid tight seal comprising an O-ring 48 and a retainer plug 50 having a threaded port connection 52 in the cylindrical outer wall 56 of the rigid partition 54.

The disc 14 in turn is connected by solder 58 in an air tight manner to the upper end of an overload element in the form of a bellows 60 that is fixedly connected at its lower end by solder 62 to a cylindrical embossed part 64 which forms an internal portion 66 of the stationary wall 54.

A wall 68 forming another cylindrical embossed part of the internal portion 66 protrudes upwardly from an embossed portion 64 and in spaced relationship to the internal wall of the bellows 60. Interconnected cylindrical wall 70, 72 of different diameters are formed in the central portion of the stationary wall 54 to accommodate the movement of an interconnected valve connecting rod 74 and an overload valve 76 in either direction therein. The connecting rod can be fixedly connected in any suitable manner, for example by threaded connections 77, to the overload valve 76.

FIG. 1 shows the overload valve 76 having a sealing element in the form of an O-ring 78 adapted to seat against the rigid surface portion 80 in a manner shown in the dotted line form.

FIG. 1 also shows that the disc 14 not only supports the diaphragm 12 but also acts as a second overload valve since its lower outer peripheral surface 82 is constructed to retain a second O-ring 84 that is adapted to seat against a second valve seat surface portion 86 in the manner shown in dotted line form.

A first fluid seal in the form of a diaphragm 88 and a wall 90 form a chamber 92 into which for example a first fluid, e.g. a fluid under high pressure, can be applied by way of inlet port 94. A second fluid seal in the form of a diaphragm 96 and a wall 98 form another chamber 100 into which a second fluid, for example a fluid under low pressure, can be applied by way of inlet port 102.

The walls 90 and 98 can be connected to the cylindrical outer wall 56 that form an integral part of the partition 54 in any suitable fluid tight manner such as by tie rods, not shown. A threaded passageway 104 and bored out passageways 106, 108, are employed to introduce a liquid into the area within the confines of the diaphragms 88 and the bellows 60 so that the interconnected cylindrical chambers 110, 112, 114, 116 and chamber 118 connected by way of passageway 120 are filled with this liquid.

After the aforementioned chambers 110–118 and passageway 120 are filled with liquid, the passageway 104–108 is sealed off by inserting an O-ring seal insert 122 and a pipe plug 124 shown in FIG. 1.

It should be understood that before the seal 48 and plug 50 are inserted a fluid of the same volume and having the same coefficient of expansion as the fluid introduced through passageway 106, 108, into chambers 110–118 is fed through passageways 52, 47 into the chamber 126. This chamber 126 is formed between the external surface of bellows 60, the cylindrical wall 56, another cylindrical wall surface 128 of the stationary wall 54 and the diaphragm 96.

The disc 14, bellows 16, O-ring 84, connecting rod 74, conductors 20–26, 38–44 and the parts of the partition 54 shown in FIG. 2 construction are identical to the similarly identified parts shown in FIG. 1.

The diaphragm 130 employed in the pressure sensor of FIG. 2 differs from the diaphragm 12 shown in FIG. 1 in that the diaphragm 12 has a rigid post member 132 fixed to and protruding in an upward direction and is terminated in the shape of a cone 134.

Another difference is that the strain gages 136, 138 and two others, not shown, which are similar to the strain gages 16–19, are mounted on a flexible cantilever beam 140 which may be constructed of a nonconductive flexible material which in turn is fixedly supported at one end on a support member 142 that is fixed at its base to the top of disc 14 rather than having the strain gage bonded on the diaphragm 12 as is shown in FIG. 1.

OPERATION

If it is assumed that the fluid under pressure being applied by way of the port 94 to the outer face of diaphragm seal 88 is the same as the fluid pressure being applied by way of port 102 to the outer face of diaphragm seal 96 then the device is as shown in solid line form in FIGS. 1 and 2.

If the fluid pressure being applied to diaphragm seal 88 is increased it will cause the seal 88 to move in an upward direction. This will in turn cause an increase in the pressure of the fill fluid in chambers 110, 86, 116, passageway 120 and chamber 118. While this action takes place the bellows 60, flexible diaphragm pressure sensor 12, the disc shaped overload valve 14, overload seal 84, connecting rod 74, overload valves 76, and seal 78 will be moved as a unit in an upward direction against the liquid fill in chamber 126 that is being compressed by the pressure in chamber 100 that in turn is being applied to the diaphragm seal 96.

As this action takes place the strain gages 16, 18, will sense the increase pressure being applied by the fluid in chamber 92 and will simultaneously alter the output voltage of its associated bridge circuit 15 to a value that is maintained proportional to the difference in pressures applied to the chambers 92 and 100.

If the pressure being applied by the fluid in chamber 92 is further increased so that it approaches an overload pressure level, the pressure acting on the bellows 60 and disc 14 will move the connecting rod 74 overload valve 76 and O-ring seal 78 further in an upward direction to an overload sealed position in which case the overload seal 78 will be in its dotted line position shown in FIG. 1.

By closing the overload valve and seal 76, 78 in this manner, the internal area of the bellows will be sealed off and no further increase in the pressure level of the fluid in chamber 92 that would otherwise rupture the bellows 60 and diaphragm 12 will be allowed to be transmitted by diaphragm 88 to chamber 110 through the overload valve and seal 76, 78.

In a similar but opposite manner to that just described it can be seen that if an increase in the fluid pressure approaching the rupture level of the diaphragm 12 and bellows 60 occurs in chamber 126 as the result of an increase in the pressure of the fluid in chamber 100, rather than in the chamber 92 previously described, the bellows 60 would in that case be compressed by the fluid in chamber 126 and the overload valve and seal 76, 78 and its associated parts would be moved in a downward direction away from their solid line position while the overload seal 84 that remains mounted on disc shaped valve 14 is moved into its dash line overload sealed position. Since the pressure of the incompressible liquid is then sealed off from exiting from the inside of the bellows any further increase in fluid in chamber 126 acting against the external surface of bellows 60 and diaphragm 12 will be neutralized by the fill pressure within the bellows 60 and the bellows and diaphragm will thus be protected from rupture.

As the bellows 60 and diaphragm 12 is moved towards a position in which the seal 84 of the overload valve 14 is placed in a seated position, indicated in dash line form, the strain gages 16, 18, will sense the increased pressure being applied by the fluid in chamber 100 and will alter the outlet voltage $E_0$ of its associated bridge circuit 15 to a value that is maintained proportional to the differences in the pressures applied to the chambers 100 and 92.

It should be understood that the overload pressure at which the overload valves and seals 14, 84, 76, 78, will be respectively moved to their associated dash line positions as described supra can be varied by altering the related size and stiffness of the bellows 60.

It should also be understood that the fluid pressure that is applied by way of port 94 to the chamber 92 can be the higher of the two pressures on the opposite side of an orifice plate in a flow line and the fluid pressure that is applied by way of port 102 to chamber 100 can be the lower of these two pressures.

The construction shown in FIG. 2 functions in a similar manner to that already described for FIG. 1 except that the deflection of the diaphragm 130 due to changes in pressure of the fluid acting on its opposite sides are transmitted by way of the rigid post member 132 to a flexible cantilever beam 140 containing strain gages 136, 138. The strain gages 136, 138 and two others, not shown, function in the same way as the previously referred to strain gages 16–19, with the previously described measuring circuit 15.

In a preferred embodiment of the invention disclosed herein the strain sensitive elements comprising the strain gage bridge 15 are of the semiconductor type in order to permit response to very small changes in the difference in fluid pressures. It is noted also that forms of transducing means other than the resistive strain gage means described herein may be employed, for example, capacitive, inductive and piezoelectric devices.

The embodiments of the invention in which an exclusive property or privilege is claimed are defined as follows:

1. In a pressure responsive device having a flexible overload element adapted to have a different fluid in contact with each of its opposite wall surfaces and being further adapted to move in response to a difference in pressure applied by said fluids, an improvement comprising a stationary wall, a rigid member forming a movable wall portion of the flexible overload element, a passageway formed in said stationary wall, a valve operably connected for movement with said rigid member to engage said stationary wall and seal off one of the fluids being applied by way of the passageway to one side of the flexible element when the magnitude of either fluid pressure exceeds a preselected overload level, a deflectable pressure sensing member connected for movement with said rigid member and forming a flexible wall of said overload element, and transducing means mounted for movement with said rigid member and operatively related to said flexible wall to respond to changes occurring in the difference in said fluid pressures thereby to produce an output signal which is related to said difference and which is independent of the movement of the flexible overload element.

2. The apparatus defined in claim 1 wherein the flexible overload element is of a bellows shape configuration.

3. The apparatus defined in claim 1 wherein the flexible overload element is of a bellows shape configuration and wherein the rigid wall and deflectable pressure sensing member form a closed end wall portion of the bellows.

4. The apparatus defined in claim 1 wherein the flexible overload element is of a bellows shape configuration, the rigid wall and deflectable pressure sensing member form a closed end wall portion of the bellows and the deflectable pressure sensing member is positioned to cover a chamber formed in the rigid wall and a passageway is employed to apply the fluid pressure acting on the inner surface of the bellows to one side of the deflectable member.

5. The apparatus as defined in claim 1 wherein the flexible overload element is of a bellows shaped configuration and wherein said transducing means comprises a resistance element bonded to the flexible wall.

6. The apparatus as defined in claim 1 wherein the flexible overload element is of a bellows shaped configuration and wherein the transducing means is mounted on a resilient deflectable cantilever beam member spaced from and adjacent to said deflectable pressure sensing member and a post extends between the deflectable pressure sensing member and the free ends of the cantilever beam for transmitting changes in pressure sensed by the deflectable pressure sensing member to the beam.

7. The apparatus as defined in claim 1 wherein the valve means is comprised of a first sealing element mounted on the rigid member that is operable by movement of the flexible overload element into fluid tight sealing engagement with one side of the stationary wall when a first one of said fluid pressures exceeds said preselected overload level and wherein the apparatus further comprises another sealing element that is connected to the rigid member operable by movement of the flexible overload element into fluid tight sealing engagement with another opposite side of the stationary wall when the other of said two fluid pressures exceeds said preselected overload level.

8. The apparatus as defined in claim 1 wherein the deflectable pressure sensing member is a membrane and wherein the engagement of said valve means with said rigid member is employed to protect said membrane from rupturing when either of said fluid pressures exceed said preselected fluid pressure overload levels.

9. The apparatus as defined in claim 1 wherein the flexible overload element is a resilient chamber that is constructed to have one of said two different fluids applied to its inner wall to increase its volume as the pressure of said last mentioned fluid is increased and to have the other of said two different fluids applied to its external wall to decrease its volume as the pressure of said last mentioned fluid is increased.

10. The apparatus as defined in claim 1 wherein the flexible overload element is a resilient chamber that is constructed to have one of said two different fluids applied to its inner wall to decrease its volume as the pressure of said last mentioned fluid is decreased and to have the other of said two different fluids applied to its external wall to increase its volume as the pressure of said last mentioned fluid is decreased.

References Cited
UNITED STATES PATENTS

| | | | |
|---|---|---|---|
| 3,206,980 | 9/1965 | Nelson | 73—398X |
| 3,372,594 | 3/1968 | Bristol | 73—407X |

DONALD O. WOODIEL, Primary Examiner

U.S. Cl. X.R.

73—407